(12) United States Patent
Kabat et al.

(10) Patent No.: US 8,353,005 B2
(45) Date of Patent: Jan. 8, 2013

(54) UNIFIED MANAGEMENT POLICY

(75) Inventors: Jack Kabat, Sammamish, WA (US);
Vadim Meleshuk, Seattle, WA (US);
Jasjeet Gill, Seattle, WA (US);
Alexander T. Weinert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 12/163,791

(22) Filed: Jun. 27, 2008

(65) Prior Publication Data

US 2009/0222882 A1    Sep. 3, 2009

Related U.S. Application Data

(60) Provisional application No. 61/032,564, filed on Feb. 29, 2008.

(51) Int. Cl.
*G06F 17/00* (2006.01)
*G06F 7/04* (2006.01)
*G06F 17/30* (2006.01)
*G06F 7/00* (2006.01)
*H04L 29/06* (2006.01)

(52) U.S. Cl. ................. 726/2; 726/1; 707/781
(58) Field of Classification Search .............. 726/1–2
See application file for complete search history.

(56) References Cited

U.S. PATENT DOCUMENTS

| | | | |
|---|---|---|---|
| 6,131,166 A | 10/2000 | Wong-Insley | |
| 7,117,220 B2 * | 10/2006 | VanderDrift | ................. 1/1 |
| 7,124,192 B2 | 10/2006 | High, Jr. et al. | |
| 7,185,192 B1 | 2/2007 | Kahn | |
| 7,209,902 B2 | 4/2007 | Stefik et al. | |
| 7,249,379 B2 | 7/2007 | Larsen | |
| 7,302,634 B2 | 11/2007 | Lucovsky et al. | |
| 7,308,704 B2 | 12/2007 | Vogel et al. | |
| 7,437,755 B2 * | 10/2008 | Farino et al. | ................. 726/5 |
| 7,624,424 B2 * | 11/2009 | Morita et al. | ................. 726/1 |
| 7,770,222 B2 * | 8/2010 | Hopen et al. | ................. 726/22 |
| 7,827,590 B2 * | 11/2010 | Hopen et al. | ................. 726/1 |
| 8,099,758 B2 * | 1/2012 | Schaefer et al. | ................. 726/1 |
| 8,190,636 B2 * | 5/2012 | Ekberg et al. | ................. 707/783 |
| 8,196,187 B2 * | 6/2012 | Kabat et al. | ................. 726/4 |
| 2002/0026592 A1 | 2/2002 | Gavrila et al. | |
| 2003/0046456 A1 * | 3/2003 | Iwao et al. | ................. 710/11 |
| 2004/0003293 A1 | 1/2004 | Viets et al. | |
| 2004/0186836 A1 | 9/2004 | Schlesinger | |
| 2005/0138419 A1 | 6/2005 | Gupta et al. | |
| 2005/0262099 A1 | 11/2005 | Manfredi et al. | |

(Continued)

OTHER PUBLICATIONS

Ajay Chander et al., "A State-Transition Model of Trust Management and Access Control", Proceedings of the 14th IEEE Workshop on Computer Security Foundations, 2001, 17 pages.

(Continued)

*Primary Examiner* — Carolyn B Kosowski
(74) *Attorney, Agent, or Firm* — Workman Nydegger

(57) ABSTRACT

Defining a unified access management policy expression that unifies access control policy with events or workflows. Unified management policy information is stored. The unified management policy information defines permissions for access to resources together with events or workflows. A request is received to execute the one or more operations on one or more objects. The requested operation is verified against the unified management rules. Verifying includes performing a single retrieval, retrieving both the access control information and the events or workflows and calculating the applicability of the rule to the conditions represented by the request. Matching rules are applied, access control decisions performed and associated workflows are executed.

19 Claims, 9 Drawing Sheets

U.S. PATENT DOCUMENTS

| | | | |
|---|---|---|---|
| 2006/0259952 A1* | 11/2006 | Lok | 726/1 |
| 2007/0038586 A1* | 2/2007 | Vaucois | 706/14 |
| 2007/0261102 A1 | 11/2007 | Spataro et al. | |
| 2008/0005115 A1 | 1/2008 | Corley et al. | |
| 2008/0016554 A1* | 1/2008 | Rits | 726/4 |
| 2008/0155647 A1* | 6/2008 | Miyawaki et al. | 726/1 |
| 2009/0064272 A1* | 3/2009 | Goldszmidt et al. | 726/1 |
| 2009/0158237 A1* | 6/2009 | Zhang et al. | 717/100 |
| 2009/0164499 A1* | 6/2009 | Samudrala et al. | 707/102 |
| 2009/0222881 A1 | 9/2009 | Kabat | |

OTHER PUBLICATIONS

Cui-Xiao Zhang et al., "Task-Role Based Dual System Access Control Model", IJCSNS International Journal of Computer Science and Network Security, vol. 6, No. 7B, Jul. 2006, pp. 211-215.

Notice of Allowance dated Feb. 22, 2012 cited in U.S. Appl. No. 12/163,782 (copy attached).

U.S. Appl. No. 12/163,782, Mar. 22, 2011, Office Action.

U.S. Appl. No. 12/163,782, Sep. 14, 2011, Office Action.

* cited by examiner

Management Policy Rule Creation

Configure the general information about the management policy.

General Information 202

Operation and Users

Condition Before

Condition After

Policy Workflows

Name* _204_

Description _206_

Permissions _208_

☑ Grants Permissions

* Indicates a required field

Finish   <Previous   Next>   Cancel

Management Policy Rule Creation

Configure the operation, users and attributes for this policy.

| General Information |
|---|
| Operation and Users 210 |
| Condition Before |
| Condition After |
| Policy Workflows |

Operation*
Select the operation type for this rule. 214

- ☑ Create   ☑ Modify
- ☑ Delete   ☑ Modify Insert
- ☐ Read     ☑ Modify Remove

Principals*
Configure who this rule applies to.

216

○ Specific Set of Users
Principal is defined as the following user set.

[ ] Browse

● Specific Set of Users
Principal is defined as the following user set.

Browse attributes of: [All Objects ▼]   [ ] Browse...

Attributes
Select the object attributes for the rule.

218

○ All Attributes
Rule applies to all attributes of the resource

● Sellect specific attributes
Rule applies to selected attributes

Browse attributes of: [All Objects ▼]   [ ] Browse...

— 212

[Finish]   [<Previous]   [Next>]   [Cancel]

* Indicates a required field

Management Policy Rule Creation

Configure the condition before the operation occurs. These settings apply to Read, Modify and Delete operations.

| | |
|---|---|
| General Information | |
| Operation and Users | Resource Definition* |
| Condition Before 220 | Configure the set the resource object must belong before the operation defined in this policy rule is applied. |
| Condition After | |
| Policy Workflows | |

○ Specific Set of Objects
Resource must part of the following object set.

[                    ] [Browse]

● Relative To Principal
Resource is defined as an attribute of principal.

Browse attributes of: [All Objects ▼]  [            ] [Browse...]

— 212

[Finish] [<Previous] [Next>] [Cancel]

* Indicates a required field

Management Policy Rule Creation

Configure the workflows for this management policy rule.

| General Information |
| Operation and Users |
| Condition Before |
| Condition After |
| Policy Workflows |

Authentication

| Add | Remove | |
|---|---|---|
| ☐ | Name | Description |

240

Authorization

| Add | Remove | |
|---|---|---|
| ☐ | Name | Description |
| ☐ | Manager Approval | |

Author

| Add | Remove | |
|---|---|---|
| ☐ | Name | Description |
| ☐ | Notify Requestor | |

\* Indicates a required field

[Create] [<Previous] [Cancel]  — 232

*FIG. 2E*

UNIFIED MANAGEMENT POLICY

CROSS-REFERENCE TO RELATED APPLICATIONS

This application claims the benefit of U.S. Provisional Application 61/032564 titled "RESOURCE STATE TRANSITION ACCESS CONTROL AND UNIFIED MANAGEMENT POLICY" filed on Feb. 29, 2008, which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

When thinking of the rules governing the management of objects two main areas are usually considered: the permissions governing access to those objects and the events or workflows they trigger as part of those operations. The basic conceptual process is to define one or more conditions that are occurring and then express the management policy that should be enforced when those conditions occur. Or simply, "When this happens, I do that." The sample relationships presented can be defined in terms of access control conditions and the events that result from the operations.

An access control system enforces access to computer resources based on predefined conditions. The access control system may be itself protecting access to resources or be a controlling module for a specialized system, like an identity management system or other system.

Access control grants the permissions of a user to perform the operation. Events, on the other hand, are triggered by the operations occurring and add workflows to the various processing stages of the same relationship. Together they define the management policy for the operation described by the expression.

In identity management systems available today, both the access control and events have been treated independently and distinct object definitions are used for both, separating the access control from the response to the actions in the system. The systems define the "when this happens" expression and then grant principals the access to perform that operation—this is known as an access control rule. Similarly, the systems define, through a different object or expression, the "when this happens" (i.e. when some operation is performed) expressions and then add the resulting processing rules for that event to respond to it.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method practiced in a computing environment. The method includes acts for defining a unified access management policy expression for access control and events or workflows. The events or workflows are just examples of possible responses to the requested action in the system that makes the definition of the management policy. The basic conceptual process is to define the condition that is occurring and then express the management policy that should be enforced when that condition occurs. Or simply, "When this happens, I do that." The event and workflow is analogous to the "I do that" in the policy expression or the reaction to the incoming request. The method stores access control information that defines permissions for access to resources based on one or more entities and one or more operations requested by the one or more entities. Events or workflows are stored that are executed in response to the one or more operations being performed. Storing events or workflows includes storing the events or workflows in a same definition as the access control information. A request is received to execute the one or more operations on one or more objects. The access control information is verified against the request. Verifying includes performing a single retrieval, retrieving both the access control information and the events or workflows. The workflows defined in the definition are executed.

In another embodiment practiced in a computing environment, a method of defining a unified management policy expression for access control and events or workflows is implemented. The method includes receiving user input at a computer implemented user interface selecting one or more principals. User input is received at a computer implemented user interface selecting one or more operation to be performed on one or more objects by the one or more principals. Additional user input is received at a computer implemented user interface selecting one or more attributes of the one or more resources. The attributes are attributes that the one or more principals perform the one or more operations on. User input is received at a computer implemented user interface defining one or more workflows that are performed if conditions of the unified management policy rule are met. One or more unified management policy rules are defined for the one or more operations. The unified management policy rules control access to resources. Defining unified management policy rules includes defining access control information and including workflows that are executed. The one or more unified management policy rules, including the workflows that are executed in response to the one or more operations being allowed, are stored. Storing events or workflows includes storing the events or workflows in a same definition as the access control information; in a computer readable medium among a collection of unified management policy rules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2A-2E illustrate various graphical user interface elements useful for defining unified policy rules;

DETAILED DESCRIPTION

Figure 1A:
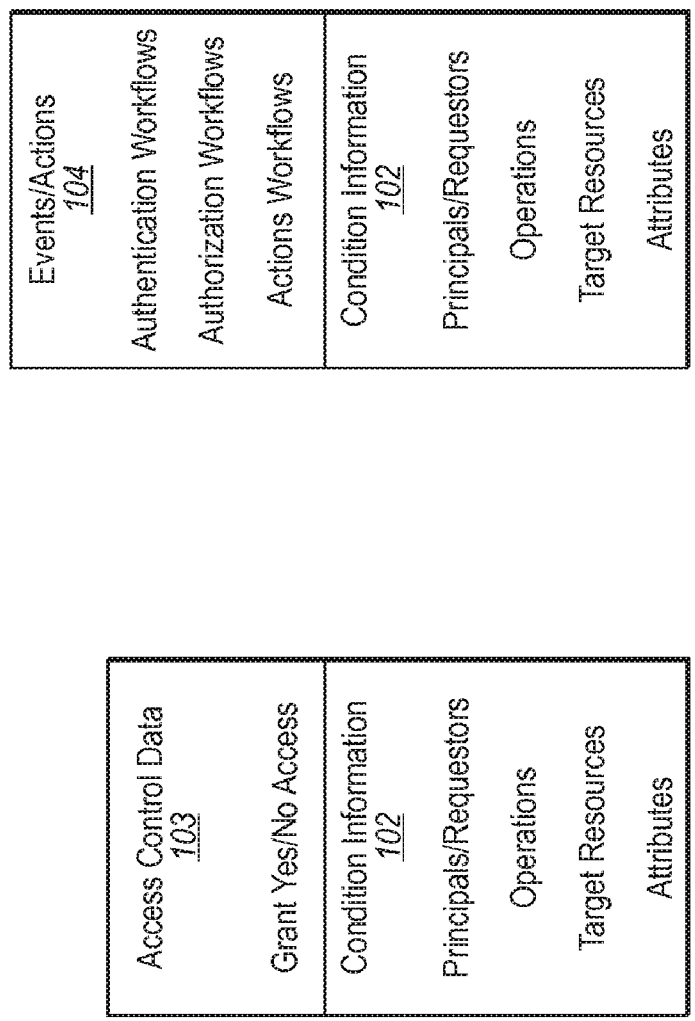
FIG. 1A illustrates a previous example of how access control information and event/action information was implemented as separate definitions.

Some embodiments described herein include functionality for defining and/or implementing a unified management policy rule that contains both rights and workflow definitions grouped for authentication, authorization and action categories of the policy. In particular some embodiments include functionality to unify the events or workflows and access control rules into a single concept, more particularly into a single object definition. This unification defines a single and consistent mechanism to describe what is occurring in the system and to attach what workflow actions are performed as part of the processing. In this model a single definition of the condition(s) that are occurring in the system is used to grant the permissions and at the same time to define the operations performed in response to the actions in the system. The system can perform a single calculation to determine both pieces of information through a consistent definition in the system. Conceptually, rights are just expressions granting the permission for someone to request to perform a defined operation.

Some embodiments include functionality for unifying the access control definition together with the events that are triggered as part of the same operation in the system. Some embodiments include functionality for performing a single calculation to determine both the access permissions and required events to be triggered in the system. Some embodiments include functionality for having a single definition of a condition in the system that is shared across both the access control rules and the event triggering mechanism. Some embodiments include functionality for implementing a flexible model where the unified management rule could represent just an access control rule; or alternatively the definition can be used to just represent the events to be fired in the system without granting any permissions as part of its definition. Some embodiments include functionality for—allowing the single definition to define the conditions in the system using variations before the current state when the operation is being requested and the final state after the operation completes, as described above. For example, some embodiments may be used to perform the following:

Model a definition of a policy that allows administrators to modify the policy data objects for the local administrative domain as long as the objects remain part of the local administrative domain set after the operation completes and define that secondary level authentication required for those users together with a notification process carried out as part of the operation all as part of a single definition.

Model a definition of a policy through a single rule that allows users to self-modify their own user information as long as the result of the modifications does not change their discipline or title and trigger the dissemination of this information into reliant systems as part of that modification.

Model a definition of a policy through a single rule that allows users to modify the group object definition as long as the group object is not changed into a security group object and those modifications are subject to an approval workflow as specified by the policy definition.

Model a definition of a policy through a single rule that allows security officers modifications of the security policy itself and enforcing an approval workflow as part of that operation and including a notification of the action to the organizations audit system.

Embodiments may include functionality for defining and comparing object's previous state and current state as part of determining if a management policy applies for a specific operation.

The system can also be used to describe the management policy rules for managing access to the rules themselves.

A unified management policy rule, or ManagementPolicyRule is based on the concept that a single definition can be used to describe what is occurring in the system. That single definition will then be bound to grant permissions and define the processes that should run as a response to the occurring operation.

Referring now to FIG. 1A, a prior art example of how access control and events and workflows were implemented separately is illustrated. In particular, FIG. 1A illustrates that previously a conditions information data structure 102 was implemented. The conditions information data structure 102 included information defining what entities (who) can perform what operations (how) on what resources. In this particular example, the conditions information data structure 102 is shown as including one or more operations fields defining what operations may be performed. Such operations may include, for example, one or more of create, delete, read, write, etc. These operations are operations that may be performed on a resource, such as a resource defined by an object implemented in object oriented computer programming. The conditions information data structure 102 may include one or more principals fields. The principals fields define what requester entities will be allowed to perform the operations defined in the operations fields. The conditions information data structure 102 may include one or more attributes fields. These fields can be used to identify which attributes of a resource object may have the operations identified in the operations fields performed on them by the entities defined in the principals fields.

The conditions information data structure 102 is associated with an access control data structure 103. The access control data structure defines if access is granted or not based on the conditions in the condition information data structure having been met.

FIG. 1A also illustrates an events/actions data structure 104. The events data structure 104 includes fields defining events, actions or workflows that occur when conditions in an access control rule have been met. In the example illustrated, the events data structure may include authentication events, authorization events, or other events. The events data structure 104 is also associated with the conditions information data structure 102, such that the events, actions, or workflows defined in the events data structure 104 are executed when conditions in the conditions information data structure 102 are met.

Figure 1B:
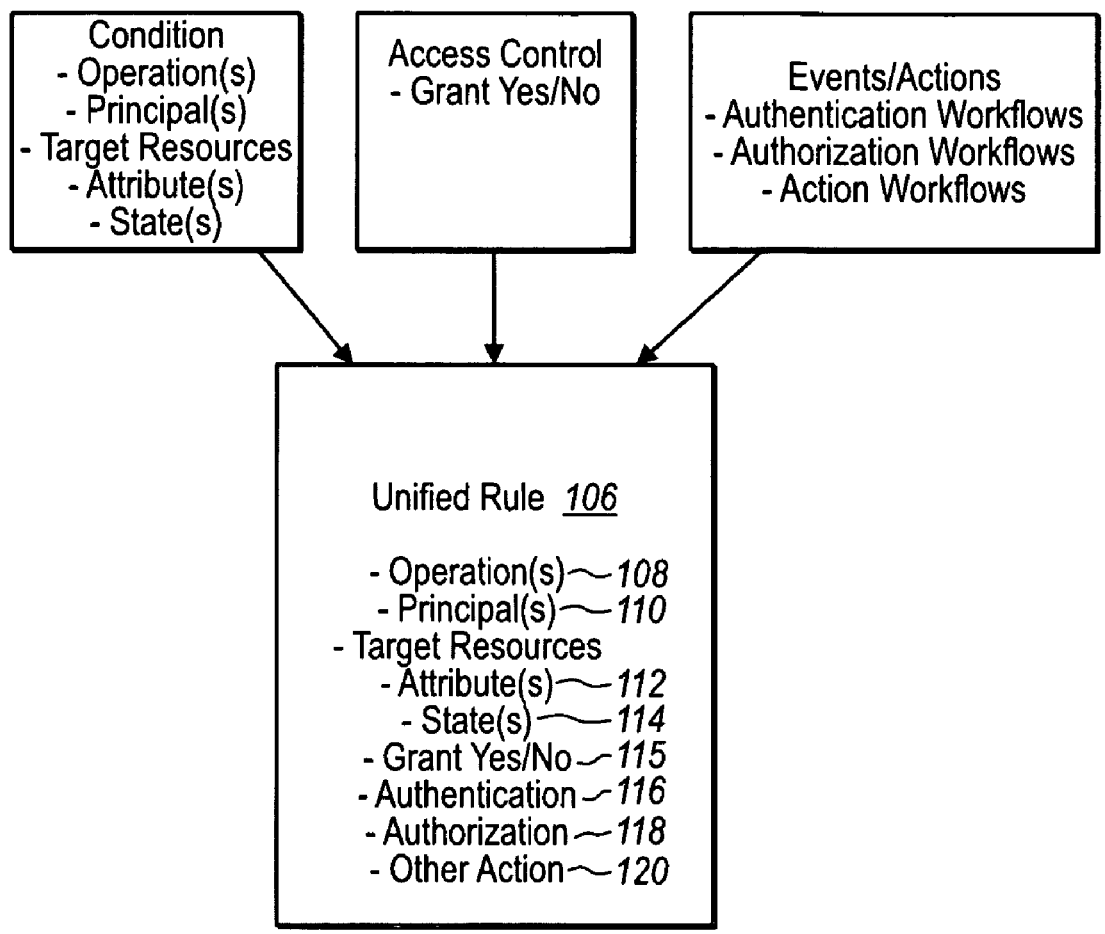
FIG. 1B illustrates the combination of condition information permissions information and event or workflow information into a unified rule defining both permissions information and event or workflow information.

Referring now to FIG. 1B, an example of a unified rule data structure 106 is illustrated. The unified rule data structure 106 may be implemented in computer readable media. FIG. 1B illustrates that the unified rule data structure 106 includes fields containing condition information, access control data, and event information that was previously implemented in individual definitions. In particular, the unified rule data structure 106 includes a single definition of the condition under which the rule is applied, which may include one or more operations fields 108 defining what operations may be performed. Such operations may include, for example, one or more of create, delete, read, modify, modify insert, or modify remove, or other operations. These operations are operations that may be performed on a resource, such as a resource defined by an object implemented in object oriented computer programming. FIG. 1B further illustrates the unified rule data structure 106 may include one or more principals fields 110. The principals fields 110 define what requestor entities will be allowed to perform the operations defined in the operations fields. These may be defined as a group or groups of entities, by identification of individual entities, by identification of attributes of objects, where the attributes identify entities, or in any other appropriate way. FIG. 1B further illustrates unified rule data structure 106 may include one or more attributes fields 112. These fields can be used to identify which attributes of a resource object may have the operations identified in the operations fields performed on them by the entities defined in the principals fields. In particular, a management policy rule may limit what attributes of a resource object may have operations performed on them. FIG. 1B further illustrates that unified rule data structure 106 may include one or more states fields 114. As described previously, the management policy rule may be defined based on a resource objects pre-operation state and an objects post-operations state. Thus, the state fields may define the pre- and post-operation states for management policy rule evaluation. The unified rule data structure may further include a grant field 115 defining whether permissions to perform an operation are granted or not. FIG. 1B also illustrates that the unified rule data structure 106 may include one or more authentication workflow fields 116, one or more authorization workflow fields 118, or one or more other workflow action fields 120 defining workflows that occur if conditions of the unified rule 106 are met. Workflows are one example of responses to the requested operations and may be more generically represented as general events or processes that are triggered as part of the operation.

Unified management policy rules may also allow for reflexivity, also referred to as reflexive rules. Reflexive rules allow definition where the requester is dynamic depending on what the target resource is. For example, one can define a single rule for all groups, where each group contains an attribute "owners" and the requestor is defined as the "owner" of the group object. When a request is received, the user is granted access only if they are identified in the owner attribute of the group. Different groups may have different owners. But a single rule can express this relationship. Other relationships can be expressed as long as the target object has a reference field to who the requesters can be. One can also do the inverse where the subject object has a reference to some object, and the resource object is defined in terms of the requester object. For example, a rule may be implemented where the requester can modify their own user object data.

An example of a simplified definition for a unified rule data structure illustrated as a ManagementPolicyRule is as follows:

```
<ManagementPolicyRule>
    <PrincipalSet/>
    <Action/>
    <ActionParameter/>
    <ResourceCurrentSet/>
    <ResourceFinalSet/>
    <GrantRight/>
    <AuthenticationWorkflowDefinition/>
    <AuthorizationWorkflowDefinition/>
    <ActionWorkflowDefinition/>
</ ManagementPolicyRule >
```

In the above definition, the first 5 elements define the condition when the management policy is applicable. This is information such as that shown in the permissions data structure 102. For example, when a full time employee (FTE) updates Group object's groupType attribute and the updated group is part of the distribute groups. This example would be expressed as:

```
< ManagementPolicyRule >
    <PrincipalSet>FTE Principal Set reference</PrincipalSet>
    <Action>Update</Action>
    <ActionParameter>groupType</ActionParameter>
    <ResourceCurrentSet>Set of all groups
    reference</ResourceCurrentSet>
    <ResourceFinalSet>Set of all distribution groups
    reference</ResourceFinalSet>
    <GrantRight/>
    < AuthenticationWorkflowDefinition />
    < AuthorizationWorkflowDefinition />
    < ActionWorkflowDefinition />
</ ManagementPolicyRule >
```

The GrantRight field includes information to facilitate deciding if this rule grants the requestor the permission to request the operation. The remaining elements define the processing rules once this condition is met. For example, the information in the events data structure 104 may be included in the ManagementPolicyRule. In the following example, the permissions for this operation will be granted and an approval workflow is defined by group owners and all the group members are notified and the email system administrator is notified. This complete definition would now be:

```
< ManagementPolicyRule >
    <PrincipalSet>FTE Principal Set reference</PrincipalSet>
    <Action>Update</Action>
    <ActionParameter>groupType</ActionParameter>
    <ResourceCurrentSet>Set of all groups
    reference</ResourceCurrentSet>
    <ResourceFinalSet>Set of all distribution groups
    reference</ResourceFinalSet>
    <GrantRight>true</GrantRight>
    < AuthenticationWorkflowDefinition />
    < AuthorizationWorkflowDefinition >Group owners approval process
    reference</ AuthorizationWorkflowDefinition >
    < ActionWorkflowDefinition >Group members notification process
    reference</ ActionWorkflowDefinition >
    < ActionWorkflowDefinition >Email system administrator
    notification
    process reference</ ActionWorkflowDefinition >
</ ManagementPolicyRule >
```

One very specific embodiment, not intended to limit the scope of other embodiments may include definitions for elements of a unified model as presented in the following table. Notably, other embodiments may include other definitions and requirements and different terminology. Thus, a reference to an element being required or the use of the term "must" or other limiting terms, is only limiting to the particular example illustrated. Other unified rule models, unifying permissions information and events information may vary in their requirements.

| Attribute Name | Data Type | Multi-valued | Required | Notes |
| --- | --- | --- | --- | --- |
| PrincipalSet | Reference to a Set | No | No | This definition is a match iff the requesting principal is a member of the set specified. |
| Action | String | Yes | Yes | One or more of CREATE, READ, MODIFUPDATE, UPDATEINSERT, UPDATEREMOVE, UPDATECHANGE, DELETE. This definition is a match iff the request is one of the types specified in the Action element. |
| ActionParameter | String | Yes | No | Name of attributes to which this definition applies. The definition is matched by a request iff the request affects any of the attributes in this element. A value of "*" indicates all attribute. Applies to Create, Read, Modify, ModifyInsert, ModifyRemove. |
| ResourceCurrentSet | Reference to a Set | No | No | A reference to a Set. The set may be a collection of objects. The definition is a match iff the resource targeted by the request is in the set specified by the reference or keyword before the request. Ignored for Create and must be set for all other. |
| ResourceFinalSet | Reference to a Set | No | No | A reference to a Set. The Set may be a collection of objects. The definition is a match iff the resource targeted by the request is in the set specified by the reference after the request. Ignored for Delete and Read (Get/Enum) operations. |
| GrantRight | Boolean | No | Yes | Boolean indicating if this definition is matched by the criteria listed above, then the permission will be granted to the PrinicipalSet to perform the action. False indicates this definition defines the management processes only without granting the right to the PrinicipalSet. |
| AuthenticationWorkflowDefinition | Reference to a Process | Yes | No | One or more references to a process object. If the conditions of this definition are met, then any processes specified in these elements must be run prior to any authZ processes, instantiation of the request, and action processes. Unhandled execution faults generated by any of the processes referenced here will result in an authentication denied fault, and will terminate further processing of the request. |

| Attribute Name | Data Type | Multi-valued | Required | Notes |
| --- | --- | --- | --- | --- |
| AuthorizationWorkflowDefinition | Reference to a Process | Yes | No | One or more references to a process object. If the conditions of this definition are met, then any processes specified in these elements must be run prior to instantiation of the request, and action processes. Unhandled execution faults generated by any of the processes referenced here will result in an authorization denied fault, and will terminate further processing of the request. |
| ActionWorkflowDefinition | Reference to a Process | Yes | No | If the conditions of this definition are satisfied by the incoming request and the user has permissions to perform this operation, then the request is allowed. Further, if AuthN, AuthZ, processes are specified and completed, then the processes specified in this field as executed after the request is committed. |

In some embodiments, a management policy object can define only a right in the system without including any processes. Further, a management policy object can define any of Authentication, Authorization, or action processes without granting the permission. A management policy object can both grant the permission in the system and define any of Authentication, Authorization, or action processes as well.

Another important note is a distinction regarding how rights and events are applied and processed. In some embodiments, for a permission to be granted to perform an operation, any ManagementPolicyRule found that satisfies the operation criteria is sufficient. In some embodiments, when multiple ManagementPolicyRule objects match the access criteria, only the existence of the match is sufficient for the right to be granted. When multiple ManagementPolicyRule objects are matched, then all the processes for each of the matched objects may be required to be run as part of each stage.

Administrators can define a unified management policy rule through the systems user interface (UI) which models both the current and after operation states of the resource being acted on, together with the operations and its parameters and subjects to which it applies and includes the event definitions that are attached to those conditions.

Figure 2D:

Referring now to FIGS. 2A-2E, an example user interface 200 is illustrated. The user interface 200 in this example includes a number of tabs that can be selected by user interaction to enable further user interaction with various user interface elements. FIG. 2A illustrates the state of the user interface 200 when a general information tab 202 is selected by a user. When the general information tab 202 is selected, the user interface 200, in this example, includes elements with which a user can interact including a name element 204 the description element 206 and a permissions element 208. The name element 204 allows a user to define a name for a policy rule. The description element 206 allows a user to provide a custom description describing the policy rule. The permissions element 208 allows a user to select whether or not the rule is one that grants permissions. In this example, when the permissions element 208 is set, permissions are granted to principals to perform actions when conditions of the rule are met. If the permissions element 208 is not set, only a management process is defined, without rights being granted.

A user can select the operations and users tab 210 (See FIG. 2B) by selecting the "Next" button 212 in the general information tab 202. The operations and users tab 210 includes an operations element 214, a principals element 216 and an attributes element 218. The operations element 214 allows a user to select the operations to which the rule applies. For example, a user can select what operations a principal will be allowed to perform when conditions are met. In the example illustrated, such operations may include: create, delete, read, modify, modify insert, or modify remove.

The principals element 216 allows a user to configure to whom (e.g. what users or requesters) the rule applies. As illustrated, in this example, this may be specified based on a specific set of users. For example, an object or list identifying objects corresponding to users may be specified. In some embodiments, the principals element 216 may be used to configure to whom the rule applies by specifying users in terms of principals as related to a resource. For example, the attributes of an object may be examined to determine principals. This enables single rule definition that covers broad relationships between the target resources and the principals requesting the operation. Examples include: Only owners of the group objects can perform updates to the group definition. Only objects creators can delete the objects.

The attributes element 218 can be used to select object attributes for a rule. In particular, a user may be given authorization to only perform actions on certain attributes of a resource. In the example illustrated, an administrative user may specify that a principal can perform specified operations on all attributes, or on selected specific attributes.

Selecting the "Next" button 212 in the operations and users tab 210 causes the selection of the condition before tab 220 (see FIG. 2C). This allows an administrative user to determine the state that a resource must be in before a request for an operation for the rule to be matched (e.g. object 102 in FIG. 1A). In the example illustrated, this can be specified by specifying that the resource is part of a particular object set. A set is some collection of objects, either explicit or dynamically constructed or both explicit and dynamically constructed. In an alternative embodiment, this can be specified by specifying that the resource is defined as an attribute of the principal authorized to operate on the resource by the rule.

Selecting the "Next" button 212 in the condition before tab 220 selects the condition after tab 230 (see FIG. 2D). This tab 230 allows the user to select the state of a resource after an operation has been performed (e.g. object 106 in FIG. 1A). As with the specification of the state of a resource before an operation is performed, this can be specified by specifying that the resource is part of a particular object set, or by specifying that the resource is defined as an attribute of the principal authorized to operate on the resource by the rule.

Selecting the "Next" button 212 in the condition after tab 230 selects the policy workflows tab 240 (see FIG. 2E). In the policy workflows tab 240, an administrative user can specify workflows that are performed as part of the policy rule. In the example illustrated, a user may specify authentication tasks, authorization tasks, and/or other action tasks.

Selecting the create button 232 causes the rule to be created and stored in a repository of rules. The repository can then be used to determine access control permissions for operations on resource objects and the associated workflows that need to be applied to operations on those resource objects.

The system can also be used to describe the unified management policy rules for managing the policy to perform operations on various resources including the rules themselves.

The following discussion now refers to a number of methods and method acts that may be performed. It should be noted, that although the method acts may be discussed in a certain order or displayed in the Figures in a certain order, no particular ordering is necessarily required unless specifically stated, or required because an act is dependent on another act being completed prior to the act being performed.

Figure 3:
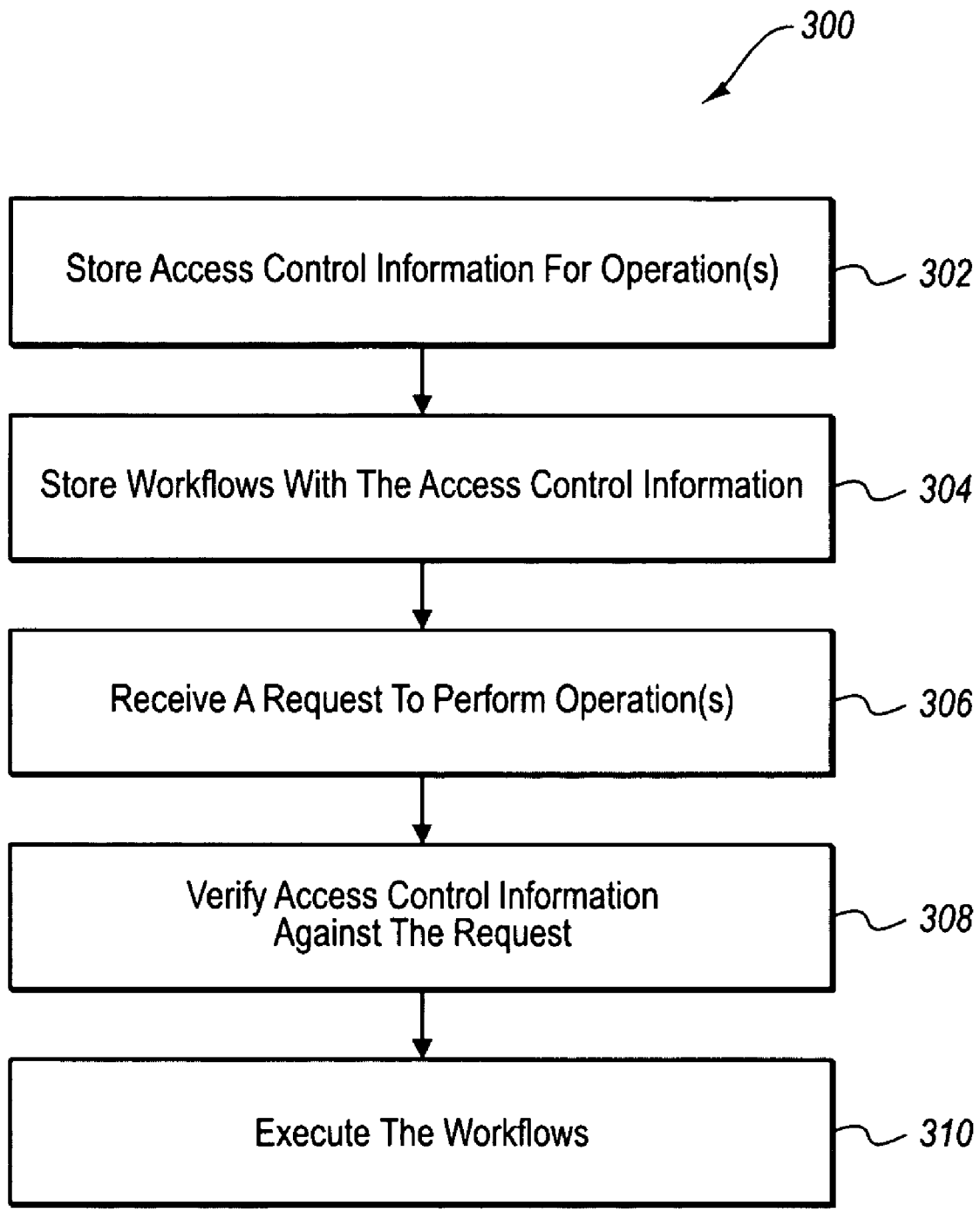
FIG. 3 illustrates a method of defining a unified rule.

Referring now to FIG. 3, a method 300 is illustrated. The method 300 may be practiced in a computing system and includes method acts for defining a unified management policy expression for access control and events or workflows. The method includes storing access control information (act 302). The access control information defines permissions for access to resources based on one or more entities and one or more operations requested by the one or more entities. The method 300 further includes storing events or workflows (act 304). The events or workflows are executed in response to the one or more operations being allowed for the specific condition described in the rule definition. Storing events or workflows includes storing the events or workflows in a same definition as the access control information. For example, FIG. 1B illustrates a unified rule 106 that includes both access control information in the form of fields 108-114 and events or workflows in the form of fields 116-120.

The method 300 further includes receiving a request to execute the one or more operations (act 306) on one or more objects. For example, a requester may request an operation to be performed on a resource object.

The method 300 further includes computing the applicable unified management policy rules that apply for the incoming request, verifying the access control information against the request (act 308) for the rules that grant access. Computing includes performing a single retrieval, retrieving both the access control information and the events or workflows. Verifying may further include evaluating the access control information. For example, in the example illustrated in FIG. 1B, verifying may include actions such as evaluating the identity of the requestor against the principals in the principals fields 110 and the requested operation against the operations in the operations fields 108.

The method 300 further includes executing the workflows defined in the definition (act 310). For example, as illustrated in FIG. 1B, authorization tasks, authentication tasks, or other tasks as defined in the unified rule 106 may be executed.

The method 300 may be performed where verifying the access control information against the request comprises performing a single calculation to determine both the access control information and the events or workflows through a consistent definition in the system. In particular, a single calculation is performed to determine if operations requested by requesters should be allowed to succeed and to determine that workflows, such as those defined in fields 116-120 of FIG. 1B, should be executed.

Embodiments of the method 300 may be practiced to use pre-operation and post-operation state information to determine if a unified management policy rule should be applicable. As such, some embodiments may be practiced where verifying the access control information against the request includes determining the states of the one or more object when the operation is requested, determining the states of the one or more objects if the operation were to proceed, generating a comparison between the states of the one or more objects when the operation is requested and the states of the one or more objects if the operation were allowed to succeed, referencing one or more unified management policy rules where the unified management policy rules control access to resources based on current and post operation state, and determining that a rule exists that allows the operation to succeed based on the comparison.

In this example, allowing the operation to succeed may include having a rule that grants permission to perform the operation. The operation is then performed resulting in a change to the one or more objects stored on the computer readable media. In an alternative embodiment, allowing the operation to succeed includes committing the operation, such that one or more changes to the one or more objects are ratified such that subsequent requests for operations on the one or more objects are based on the operation after the one or more changes have been performed on the one or more objects. In particular, an operation may be performed when requested, but may not be ratified until the policy conditions of a unified management policy rule have been met. If the conditions are not met, the operation is rolled back.

Thus, embodiments may be implemented where determining the states of the one or more objects if the operation were allowed to succeed includes calculating one or more post-operation states without actually performing the operation on a resource object, or where determining the states of the one or more objects if the operation were allowed to succeed includes examining the one or more objects after the operation has been performed on the one or more objects, with the option of rolling back any operations.

As noted previously, unified management policy information may be stored related to one or more of operations, principals, attributes, states, or other information. As such, the method 300 may be performed by storing unified policy information that defines permissions for access to resources based on one or more entities and one or more operations requested by the one or more entities includes storing information about operations including one or more of create, delete, read, modify, modify insert, or modify remove operations. Alternatively or additionally, the method 300 may be performed by storing unified policy information that defines permissions for access to resources based on one or more entities and one or more operations requested by the one or more entities includes storing information about principal entities by specifying the principal entities as a group of principals. Alternatively or additionally, the method 300 may be performed by storing unified policy information that defines permissions for access to resources based on one or more entities and one or more operations requested by the one or more entities includes storing information about principal entities by specifying the principal entities as attributes of a resource object. Alternatively or additionally, the method 300 may be performed by storing unified policy information that defines permissions for access to resources based on one or more entities and one or more operations requested by the one or more entities includes storing information about attributes of a resource. The attributes of a resource are the attributes which operations can be performed on by the one or more entities. Alternatively or additionally, the method 300 may be performed by storing unified policy information that defines permissions for access to resources based on one or more principals or entities and one or more operations requested by the one or more principals or entities includes storing information about pre-operation state and post-operation state of resource objects.

Figure 4:
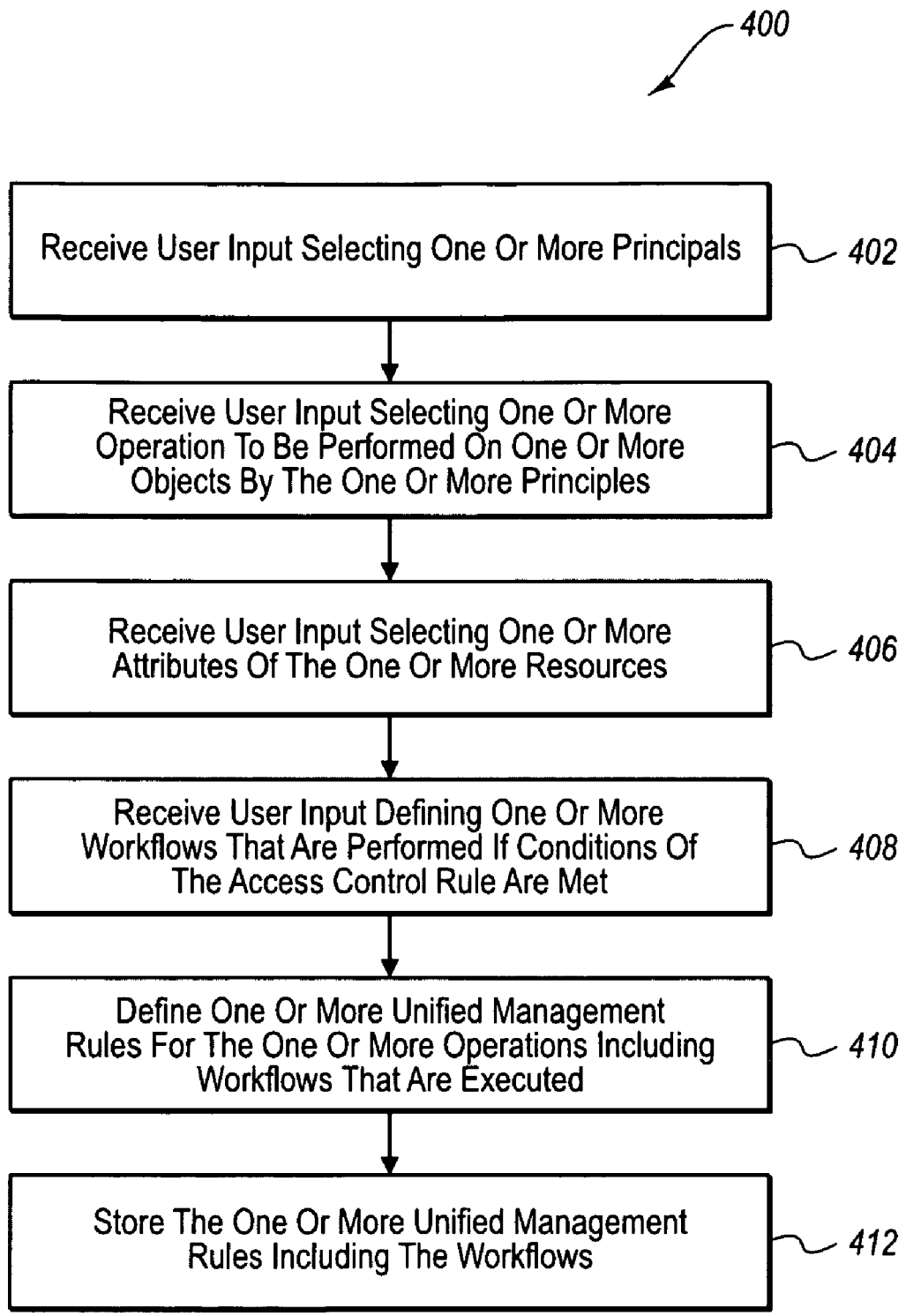
FIG. 4 illustrates a method of generating unified rules.

Referring now to FIG. 4, a method 400 is illustrated, which may be practiced in a computing environment and includes acts for defining a unified access management policy expression for access control and events or workflows. The method 400 includes receiving user input at a computer implemented user interface selecting one or more principals (act 402). FIG. 2B at 216 illustrates an example of this functionality. Here a user can define what users or requesters the rule applies. As illustrated, in this example, this may be specified based on a specific set of users. For example, an object or list identifying objects corresponding to users may be specified. In some embodiments, the principals element 216 may be used to configure to whom the rule applies by specifying users in terms of principals as related to a resource. For example, the attributes of an object may be examined to determine principals.

The method 400 further includes receiving user input at a computer implemented user interface selecting one or more operation to be performed on one or more objects by the one or more principals (act 404). An example of this is illustrated in FIG. 2B at 214. In this example, a user can select, by selection of an appropriate check box, one or more of create, delete, read, modify, modify insert, or modify remove operations.

The method 400 further includes receiving user input at a computer implemented user interface selecting one or more attributes of the one or more resources (act 406). The attributes are attributes that the one or more principals perform the one or more operations on. An example of this is illustrated at 218 of FIG. 2B. In the example illustrated, an administrative user may specify that a principal can perform specified operations on all attributes, or on selected specific attributes.

The method 400 further includes receiving user input at a computer implemented user interface defining one or more workflows that are performed if conditions of the unified management policy rule are met (act 408). An example of this is illustrated at FIG. 2E, where a user can add authentication, authorization, or other workflows that can be added to a unified management policy rule. These workflows will be executed if and when conditions, such as conditions related to principals and actions, are met.

The method 400 further includes defining one or more unified management policy rules for the one or more operations (act 410) based on the user input received. The unified management policy rules control access to resources. Defining unified management policy rules includes defining the access control information and workflows that are to be executed on the incoming request. The method 400 further includes storing the one or more unified management policy rules, including the workflows (act 412) that are executed in response to the one or more operations being performed. Storing events or workflows includes storing the events or workflows in a same definition as the unified management policy information; in a computer readable medium among a collection of unified management policy rules. For example, when a user clicks the create button 232 on the interface illustrated at FIG. 2E, a rule including information previously entered by a user may be stored among a collection of unified management policy rules.

Embodiments of the present invention may comprise or utilize a special purpose or general-purpose computer including computer hardware. For example, the embodiments described previously may be implemented using computing system comprising appropriate hardware and/or software including processors, memory, storage, operating systems, application software or other hardware or software. Additionally components may be implemented on each their own separate stand-alone computer system including individualized hardware where the machines are interconnected through network communication channels or other communication channels. Alternatively, components may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of defining a unified management policy expression for expressing an access control policy controlling operations on resources and execution of events or workflows, the method comprising:
   storing access control information that defines permissions for access to resources based on one or more entities and one or more operations requested by the one or more entities;
   storing events or workflows that are executed in response to the one or more operations being allowed on resources by one or more entities and one or more operations requested by the one or more entities, wherein storing events or workflows comprises storing the events or workflows in a same definition as the access control information in unified management policy rules;
   receiving a request to execute the one or more operations on one or more objects;
   calculating one or more of the unified management policy rules that apply for a given request and verifying the access control information against the request, wherein verifying comprises performing a single retrieval, retrieving both the access control information and the events or workflows, and wherein the unified management policy rules includes one or more rules that are reflexive such that calculating the one or more of the applicable unified management policy rules comprises determining that a particular requestor is defined in a rule based on a dynamic definition of the requestor based on a relationship of the requestor and a target resource object of the one or more objects; and
   executing the workflows defined in the definition.

2. The method of claim 1, wherein calculating one or more of the unified management policy rules and verifying the access control information against the request comprises performing a single calculation to determine both the access control information and the events or workflows through a consistent definition in the system.

3. The method of claim 1, wherein calculating one or more of the unified management policy rules and verifying the access control information against the request comprises:
   determining the states of the one or more objects when the operation is requested;
   determining the states of the one or more objects if the operation were allowed to succeed;
   generating a comparison between the states of the one or more objects when the operation is requested and the states of the one or more objects if the operation were allowed to succeed; and
   referencing one or more unified management policy rules, the unified management policy rules controlling access to resources based on current and post operation state, and determining that a rule exists that allows the operation to succeed based on the comparison.

4. The method of claim 3, wherein allowing the operation to proceed comprises granting permission to a request to perform the operation, where after the operation is performed resulting in a change to the one or more objects stored on the computer readable media.

5. The method of claim 3, wherein allowing the operation to succeed comprises committing the operation, such that one or more changes to the one or more objects are ratified such that subsequent requests for operations on the one or more objects are based on the operation after the one or more changes have been performed on the one or more objects.

6. The method of claim 3, wherein determining the states of the one or more objects if the operation were allowed to succeed comprises calculating one or more post-operation states.

7. The method of claim 3, wherein determining the states of the one or more objects if the operation were allowed to succeed comprises examining the one or more objects after the operation has been performed on the one or more objects.

8. The method of claim 1, wherein storing access control information comprises storing information about operations including one or more of create, delete, read, modify, modify insert, or modify remove operations.

9. The method of claim 1, wherein storing access control information comprises storing information about principal entities by specifying the principal entities as a group of principals.

10. The method of claim 1, wherein storing access control information comprises storing information about principal entities by specifying the principal entities as attributes of a resource object.

11. The method of claim 1, wherein storing access control information comprises storing information about attributes of a resource, wherein the attributes of a resource are the attributes which operations can be performed on by the one or more entities.

12. The method of claim 1, wherein storing access control information comprises storing information about pre-operation state and post-operation state of resource objects.

13. In a computing environment, a tangible computer readable storage device having stored thereon a data structure including a definition of unified management policy, the unified management policy including provisions for unified management policy controlling access to resources and resultant actions, the tangible computer readable storage device comprising:
   a condition definition, wherein the condition definition defines when the unified management policy is applicable, and wherein the condition definition comprises:
      a first field comprising data stored on the computer readable storage device, the first field comprising a definition of one or more principals to whom the a rule applies when performing one or more requested actions, wherein the definition of one or more principals to whom a rule applied when performing one or more actions is part of a definition of the unified management policy;
      a second field comprising data stored on the computer readable storage device, the second field comprising a definition of the one or more requested actions, wherein the definition of the one or more requested actions is part of the definition of the unified management policy;
      a third field comprising data stored on the computer readable storage device, the third field including attribute information defining the attributes on which the one or more principals perform the one or more actions on;
      a fourth field comprising data stored on the computer readable storage device, the fourth field including resource information defining the resources on which the one or more principals perform the one or more actions on; and
      a fifth field comprising data stored on the computer readable storage device, the fifth field including Grant right Boolean information indicating that permission will be granted to the principles to perform the actions; and
   an event definition, wherein the event definition comprises a definition of what occurs when conditions in the condition definition are met, and wherein the event definition comprises:
      a sixth field, comprising data stored on the computer readable storage device, the sixth field comprising a definition of an action workflow that that is executed when the conditions in the conditions definition are met, wherein the definition of the action workflow is part of the definition of the unified management policy,
   wherein the unified management policy includes one or more rules that are reflexive such that calculating one or more unified management policy rules that apply for a given request comprises determining that a particular requestor is defined in a rule based on a dynamic definition of the requestor based on a relationship of the requestor and a target resource object.

14. The tangible computer readable storage device of claim 13, wherein the event definition further comprises a seventh field, comprising data stored on the computer readable storage device, the seventh field comprising an authentication workflow definition, the authentication workflow definition including one or more references to one or more process objects, wherein if conditions of authentication workflow definition are met, then any processes specified in authentication workflow definition are run prior to any authorization processes, instantiation of a user request for actions, and action processes.

15. The tangible computer readable storage device of claim 13, wherein the event definition further comprises an eighth field, comprising data stored on the computer readable storage device, the eighth field comprising an authorization workflow definition, the authorization workflow definition defining one or more references to one or more process objects, and wherein if conditions of authorization workflow definition are met, then any processes specified in authorization workflow definition is run prior to instantiation of a user request for actions, and action processes.

16. The tangible computer readable storage device of claim 13, wherein the event definition further comprises a ninth field including resource current set definition including a reference to a set, wherein the resource current set definition is a match if and only if a resource targeted by a request for an action is in the set specified by a reference or keyword before the action has been performed.

17. The tangible computer readable storage device of claim 13, wherein the event definition further comprises a tenth field including a resource final set definition, including a reference to a set, wherein the resource final set definition is a match if and only if a resource targeted by request for an action is in the set specified by a reference or keyword after the action has been performed.

18. In a computing environment, a method of defining a unified management policy expression for access control and events or workflows, the method comprising:
   receiving user input at a computer implemented user interface selecting one or more principals;
   receiving user input at a computer implemented user interface selecting one or more operation to be performed on one or more objects by the one or more principals;
   receiving user input at a computer implemented user interface selecting one or more attributes of the one or more resources, the attributes being attributes that the one or more principals perform the one or more operations on;
   receiving user input at a computer implemented user interface defining one or more workflows that are performed if conditions of the unified management policy rule are met;
   defining one or more unified policy rules for the one or more operations, the unified policy rules controlling access to resources, wherein defining unified policy rules comprises defining access control rules including workflows that are executed; and
   storing the one or more unified management policy rules, including the workflows that are executed in response to the one or more operations being requested, wherein storing events or workflows comprises storing the events or workflows in a same definition as the unified management policy information a computer readable medium among a collection of unified management policy rules, wherein the one or more unified management policy includes at least one rule that is reflexive such that calculating a unified management policy rule that applies for a given request comprises determining that a particular requestor is defined in the rule based on a dynamic definition of the requestor based on a relationship of the requestor and a target resource object.

19. The method of claim 18, wherein the one or more workflows comprise at least one of an authorization workflow, an authentication workflow, or an action workflow.

* * * * *